United States Patent
Wackerow et al.

(10) Patent No.: US 7,131,261 B2
(45) Date of Patent: Nov. 7, 2006

(54) METHOD AND ELECTRONIC CONTROL UNIT FOR DIAGNOSING A CATALYTIC CONVERTER

(75) Inventors: René Wackerow, Ditzingen (DE); Erich Schneider, Kirchheim (DE)

(73) Assignee: Robert Bosch GmbH, Suttgart (DE)

( * ) Notice: Subject to any disclaimer, the term of this patent is extended or adjusted under 35 U.S.C. 154(b) by 73 days.

(21) Appl. No.: 10/481,741

(22) PCT Filed: Dec. 7, 2002

(86) PCT No.: PCT/DE02/04493

§ 371 (c)(1),
(2), (4) Date: Dec. 23, 2003

(87) PCT Pub. No.: WO03/091552

PCT Pub. Date: Nov. 6, 2003

(65) Prior Publication Data

US 2004/0134185 A1    Jul. 15, 2004

(30) Foreign Application Priority Data

Apr. 23, 2002 (DE) .............................. 102 18 015

(51) Int. Cl.
*F01N 3/00* (2006.01)
(52) U.S. Cl. .................. 60/277; 60/274; 60/276; 60/285; 73/118.1; 123/674
(58) Field of Classification Search ........... 60/274, 60/276, 277, 285; 73/118.1; 123/674
See application file for complete search history.

(56) References Cited

U.S. PATENT DOCUMENTS

| | | | |
|---|---|---|---|
| 4,622,809 A | | 11/1986 | Wollenhaupt et al. |
| 5,842,339 A | | 12/1998 | Bush et al. |
| 5,857,163 A | * | 1/1999 | Trombley et al. ........... 701/101 |
| 5,987,883 A | | 11/1999 | Schneider |
| 6,105,366 A | | 8/2000 | Zhang |
| 6,145,302 A | * | 11/2000 | Zhang et al. ................. 60/274 |
| 6,151,888 A | * | 11/2000 | Schneider et al. ............ 60/274 |
| 6,499,291 B1 | * | 12/2002 | Lang et al. .................... 60/277 |

* cited by examiner

*Primary Examiner*—Binh Q. Tran
(74) *Attorney, Agent, or Firm*—Walter Ottesen

(57) ABSTRACT

A method for diagnosing a catalytic converter (7), which is arranged in an exhaust-gas system (6) of an internal combustion engine (1) has the steps of: detecting the signal (USHK) of an exhaust-gas probe (9) downstream of the catalytic converter; forming a limit value model amplitude (AHKF) from at least one quantity (ML, n) which occurs upstream of the catalytic converter (7); forming a catalytic converter evaluation quantity (DKATI) whose value increases with increasing deviation of the amplitude (AHK) of the signal (USHK) from the limit value model amplitude (AHKF); evaluating the operability of the catalytic converter (7) on the basis of the catalytic converter evaluation quantity (DKATI); stopping the evaluation when an oxygen-dependent catalytic converter load (KATIN) exceeds or drops below a threshold value. The method is characterized in that the threshold value is pregiven in dependence upon the signal (USHK) of the exhaust-gas probe (9) rearward of the catalytic converter.

12 Claims, 4 Drawing Sheets

METHOD AND ELECTRONIC CONTROL UNIT FOR DIAGNOSING A CATALYTIC CONVERTER

CROSS REFERENCE TO RELATED APPLICATION

This application is the national stage of PCT/DE 02/04493, filed Dec. 7, 2002, designating the United States.

FIELD OF THE INVENTION

The invention proceeds from a method and an arrangement for diagnosing a catalytic converter.

BACKGROUND OF THE INVENTION

From U.S. Pat. No. 5,987,883, a method and an arrangement are known wherein an interruption of the diagnosis of the catalytic converter is provided when specific stop criteria are present. One stop criterion is the reaching of a threshold value of the charge of oxygen into the catalytic converter or of the discharge of oxygen out of the catalytic converter. The limiting of the diagnosis considers nonlinearities in the oxygen storage behavior of the catalytic converter. The oxygen storage in the catalytic converter for high oxygen charge or oxygen discharge cannot be described by the same model parameters as for low oxygen charge or oxygen discharge.

The interruption or the non-triggering of the diagnosis under such conditions, on the one hand, reliably prevents false diagnostic results but, on the other hand, reduces also the rate of diagnosis.

SUMMARY OF THE INVENTION

The invention has as its basis to so change the known reliable method that the diagnosis is triggered more often for driving profiles occurring during typical everyday operation (course of the vehicle speed over the time) and/or is more often completed with a result.

According to the invention, it is provided to make the threshold value for the oxygen-dependent catalytic converter load dependent upon the signal of an exhaust-gas probe downstream of the catalytic converter.

The invention is based upon the realization of the following interrelationships. In the known method of the catalytic converter diagnosis, the triggering of the diagnosis is limited primarily via a movement out of the permitted load/rpm range. The fixed load/rpm range has the consequence that the upper threshold must be determined with consideration as to a limit catalytic converter, that is, a catalytic converter which just no longer reaches the required conversion. Otherwise, with higher oxygen charge or oxygen discharge, one cannot distinguish good catalytic converters from catalytic converters which are just poor. On the other hand, except for some exceptions, catalytic converters lose their conversion capabilities so slowly that they reach the limit catalytic converter state only with a vehicle driving capacity in the order of magnitude of 200,000 km.

The catalytic converter diagnosis is carried out based on the amplitude of the signal of the exhaust-gas probe downstream of the catalytic converter and based on a limit value model amplitude. Small amplitudes of the signal of the exhaust-gas probe downstream of the catalytic converter indicate a good catalytic converter which still buffers larger oxygen charges or oxygen discharges than a limit catalytic converter and therefore can also still be checked for greater oxygen charges or oxygen discharges with the previously known method. In the subsequent check, catalytic converters which are less deteriorated can be reliably evaluated as good. If the check, however, yields no clear result, which points toward a good catalytic converter, a conclusion cannot be reliably drawn as to a deteriorated catalytic converter.

Accordingly, the diagnosis can be confirmed with the check at higher oxygen charges and oxygen discharges but cannot be reliably disproved. In the case that the diagnosis was not confirmed, the check can be repeated at lower oxygen charges or oxygen discharges in order to be able to distinguish reliably between a catalytic converter which is still good and a catalytic converter which is already deteriorated.

The advantage of the method of the invention is that the diagnosis is more often triggered at small amplitudes of the signal of the exhaust-gas probe downstream of the catalytic converter and/or that the diagnosis is interrupted less often. Because the good catalytic converters in this case can be reliably confirmed as good, in this case, the frequency with which the diagnostic results are achieved can be increased.

One configuration provides that the threshold value is pregiven in dependence upon the fluctuation width of the signal of the exhaust-gas probe downstream of the catalytic converter.

A further embodiment is characterized in that a specific threshold value is assigned to a specific fluctuation width and that the threshold value is reduced when the fluctuation width drops below the specific fluctuation width.

A further embodiment provides that a specific threshold value is assigned to a specific fluctuation width and that the threshold value is increased when the fluctuation width exceeds the specific fluctuation width.

This configuration can be supplemented in that the catalytic converter is evaluated as not functional when the index for the deviation exceeds a pregiven diagnostic threshold value after a pregiven time span.

According to a further embodiment, sequentially in time occurring values of the difference of the amplitude of the signal of the exhaust-gas probe downstream of the catalytic converter and the limit value model amplitude are summed (integrated).

A further embodiment provides that the summing does not take place when the oxygen-dependent catalytic converter load exceeds a pregiven maximum value or drops below a pregiven minimum value.

According to a further configuration, the summation does not take place when the oxygen-dependent catalytic converter load (corresponding to the oxygen excess or oxygen deficiency flowing into the catalytic converter per unit of time) exceeds a pregiven maximum value or drops below a pregiven minimum value.

A further embodiment is characterized in that with the determination of the catalytic converter load, the product of the air mass (which is inducted by the internal combustion engine, possibly per unit of time) or the air quantity and the deviation of the oxygen concentration in the exhaust gas from the oxygen concentration, which occurs at stoichiometric combustion, is considered. This deviation is detected by the exhaust-gas probe upstream of the catalytic converter.

According to a further embodiment, and in the determination of the catalytic converter load, the integration of the product of the air mass or air quantity, which is inducted by the internal combustion engine, possibly per unit of time, and the deviation of the actuating quantity of a mixture control loop from a neutral value is considered.

The invention is also directed to an electronic control arrangement for carrying out at least one of the above-given methods and/or one of the above-mentioned configurations and embodiments.

BRIEF DESCRIPTION OF THE DRAWINGS

The invention will now be explained with reference to the drawings wherein.

DESCRIPTION OF THE PREFERRED EMBODIMENTS OF THE INVENTION

Figure 1:
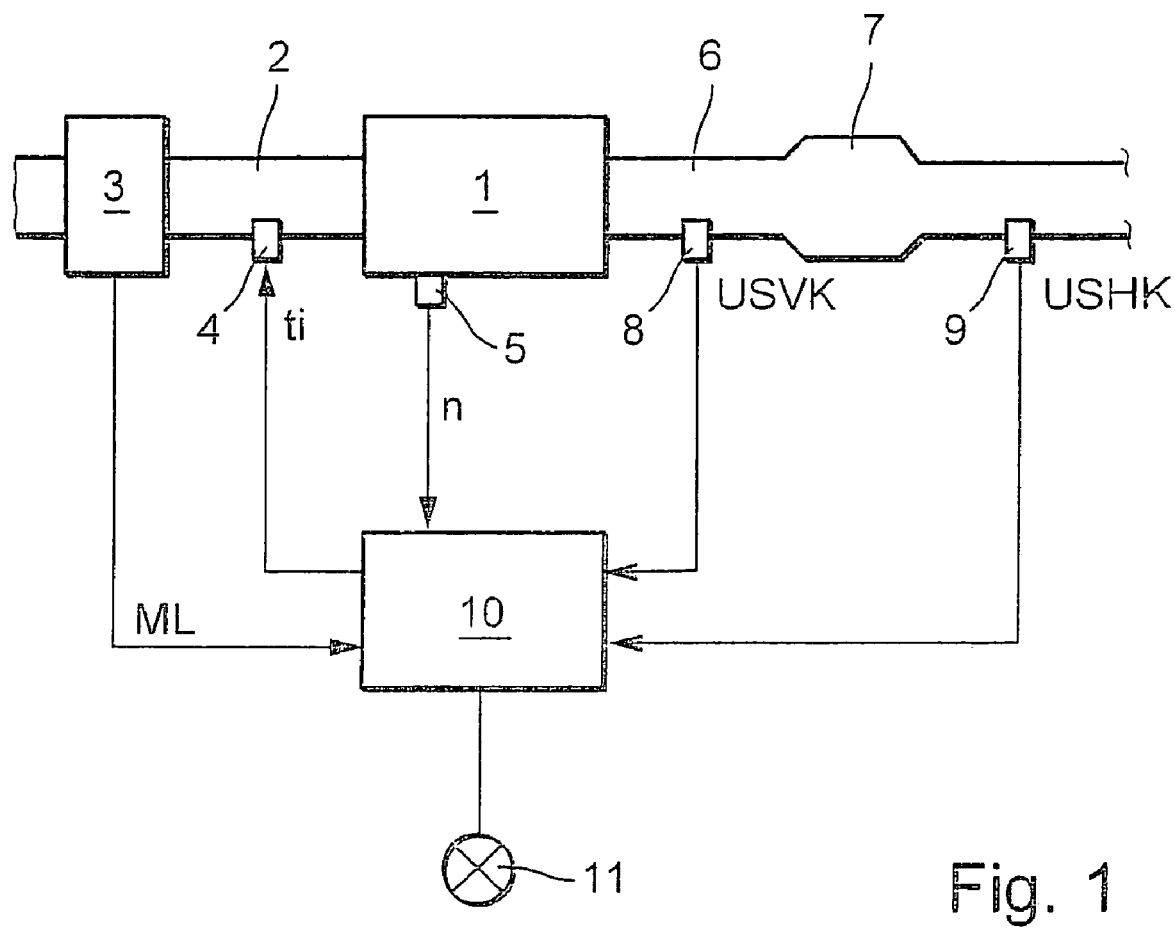
FIG. 1 shows the technical background.

FIG. 1 shows an internal combustion engine 1 having an intake manifold 2, a load detecting means 3 for detecting at least the inducted air mass ML or the air quantity, fuel metering means 4, an rpm sensor 5 which outputs an rpm signal (n), an exhaust-gas system 6, a catalytic converter 7, an exhaust-gas probe 8 upstream of the catalytic converter which outputs a signal USVK, an exhaust-gas probe 9 rearward of the catalytic converter which outputs a signal USHK, a control apparatus 10 which outputs a fuel metering signal ti to the fuel metering means 4 and a means 11 for indicating a fault.

The control apparatus 10 receives the signals ML of the load detecting means 3, the signal (n) of the rpm sensor 5 as well as the signals USVK and USHK of the two exhaust-gas probes (8, 9) and determines therefrom the fuel metering signal ti, for example, an injection pulse width for driving injection valves as a configuration of the fuel metering means 4. For this purpose, a base value of the drive signal ti can, for example, be determined as a function of the inducted air mass ML or the air quantity and the rpm (n). The base value can be corrected in a control loop via a controller actuating quantity FR which, in a manner known per se, can be generated by applying a PI control strategy to the deviation of the signal USVK of the exhaust-gas probe 8 upstream of the catalytic converter from a desired value. The signal USHK of the exhaust-gas probe 9 rearward of the catalytic converter can be additionally included in the formation of the fuel metering signal ti, for example, for forming the desired value.

According to the method known from the state of the art, the signal USHK of the exhaust-gas probe 9 rearward of the catalytic converter is detected. Furthermore, measurable quantities, which influence the oxygen entry into the catalytic converter 7, are detected upstream of the catalytic converter 7. Examples of such quantities are the inducted air mass ML or the air quantity and the controller actuating variable FR or the signal USVK of the exhaust-gas probe 8 forward of the catalytic converter. From at least one of these quantities, which are detected upstream of the catalytic converter 7, an oxygen-dependent catalytic converter load KATIN is determined from which thereafter a limit value model signal USHK-GMS is computed and from which, in turn, a limit value model amplitude AHKF for the signal USHK of the exhaust-gas probe 9 downstream of the catalytic converter or its amplitude AHK is computed. The limit value model signal USHK-GMS corresponds to a signal course which is dependent upon a modelled oxygen fill level of the catalytic converter 7 on the basis of the described quantities measurable upstream of the catalytic converter 7. The (hypothetical) influence of a catalytic converter 7, which is to be evaluated as just still good, is the basis of the formation of the limit value model signal USHK-GMS.

Subsequently, the formation of a catalytic converter evaluation quantity DKATI takes place as a function of the difference of the limit value model amplitude AHKF and the amplitude AHK of the signal of the exhaust-gas probe 9 downstream of the catalytic converter. If the real catalytic converter 7 is still better than the model catalytic converter which is based on the formation of the limit value model signal USHK-GMS and which defines a catalytic converter which is just still good, the amplitudes AHK are less than limit value model amplitudes AHKF.

Under the precondition that the DKATI-formation receives the sign of the difference AHKF less AHK, the catalytic converter 7 is accordingly evaluated as good when DKATI turns out to be positive. If, in contrast, DKATI turns out to be negative, the catalytic converter 7 is evaluated as poor and, the indicating means 11 is activated as needed.

Accordingly, the catalytic converter 7 is therefore evaluated via a method wherein: the amplitude AHK of the signal USHK of the exhaust-gas probe 9 downstream of the catalytic converter is detected; a limit value model amplitude AHKF is formed from the oxygen-dependent catalytic converter load KATIN from at least one quantity measured upstream of the catalytic converter 7; the deviation of the amplitude AHK of the signal USHK from the limit value model amplitude AHKF is determined; and, the operability of the catalytic converter 7 is evaluated on the basis of a catalytic converter evaluation quantity DKATI determined from the deviation.

The catalytic converter 7 is advantageously evaluated as non-operational when the catalytic converter evaluation quantity exceeds a pregiven diagnostic threshold value only after a pregiven time span.

As an index for the deviation of the amplitude AHK of the signal USHK from the limit value model amplitude AHKF, time sequential values of the difference between the two values can be summed (integrated). Purposefully, a reference to time is established by a division. The obtained time-averaged signal can be the catalytic converter evaluation quantity DKATI.

Details as to signal courses, which are evaluated in this context, are disclosed in Patent DE 196 23 335 C1 (U.S. Pat. No. 5,987,883) mentioned initially herein. The listed German Patent or United States patent should therefore be incorporated by reference in the disclosure of this invention.

Figure 2:
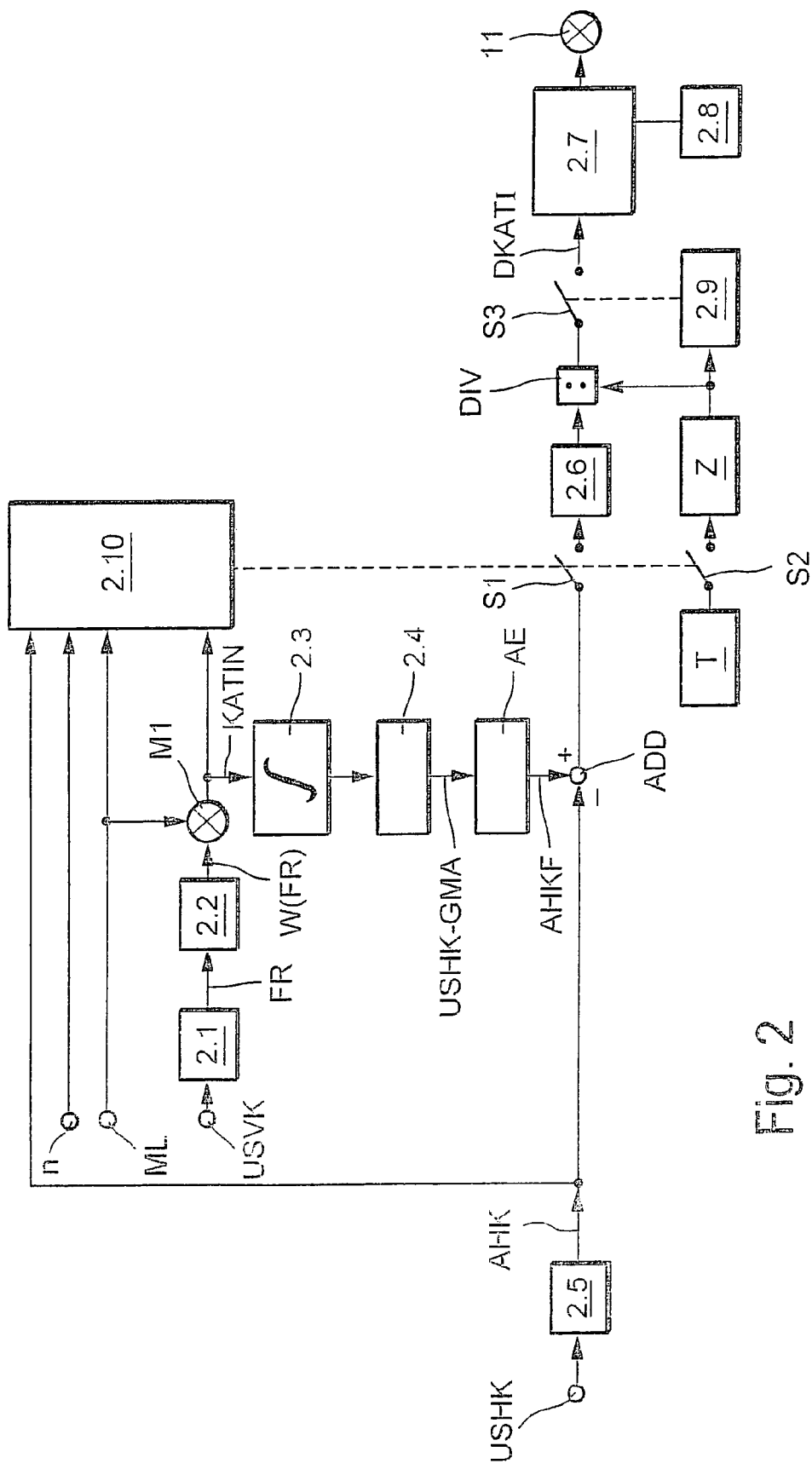
FIG. 2 shows an embodiment of the invention in the form of function blocks.

FIG. 2 shows an embodiment of the invention in a function block illustration. In a first block 2.1, the controller actuating quantity FR is formed from the signal USVK of the exhaust-gas probe 8 upstream of the catalytic converter. A second block 2.2 functions for filtering out an alternating component W(FR) of the controller actuating quantity FR. Alternatively, the alternating component W(FR) of the signal USVK is filtered out directly from the signal USVK. This can, for example, take place via the formation of the difference of the instantaneous value and the mean value of the controller actuating quantity FR or of the signal USVK. The alternating component W(FR) defines, with its magnitude and sign, an index for the oxygen content of the exhaust gas.

By multiplication of the inducted air mass ML or the air quantity in a first multiplier member M1, a quantity KATIN is obtained which is an index for the positive or negative charge of oxygen into the catalytic converter 7. KATIN is therefore an index for the catalytic converter load. The integration of this quantity in a third block 2.3 supplies an index for the instantaneous oxygen fill level of the catalytic converter 7. The integration runs in limits as are typical for a catalytic converter 7 which is just still usable. If such a catalytic converter 7 can, for example, store a quantity X0 of oxygen and if this value is reached with the integration, then the integration result is held constant up to the reversal of the integration direction.

In this time, the limit value model signal USHK-GMS for the signal (which is formed in a fourth block 2.4) of the exhaust-gas probe 9 downstream of the catalytic converter is maintained at a level characteristic for oxygen-rich exhaust gas. This is so because one must proceed from the condition that the already-filled catalytic converter 7 passes an additional oxygen charge.

With a sign change of FR (or USVK), KATIN also changes the sign and the direction of integration in the third block 2.3 is reversed. If the catalytic converter 7 was previously filled with oxygen, then it is now emptied. As soon as the integration value represents an empty catalytic converter 7, the limit value model signal USHK-GMS is changed in the fourth block 2.4 to a value characteristic for oxygen-deficient exhaust gas. The limit value model signal USHK-GMS is accordingly formed in dependence upon a modeled catalytic converter fill level on the basis of a hypothesis for the catalytic converter condition and further on the basis of quantities, which are measurable upstream of the catalytic converter 7 and which represent the oxygen entry into the catalytic converter 7.

In an amplitude determination AE, the amplitude AHKF of the limit value model signal USHK-GMS is determined and, in a fifth block 2.5, the amplitude AHK of the signal USHK of the exhaust-gas probe 9 rearward of the catalytic converter is determined. In an adder ADD, a difference formation takes place of the amplitudes AHK and AHKF. Available switches S1, S2, S3 are first assumed to be closed. Thereafter, the difference is integrated in a sixth block 2.6. To obtain a mean value of the integration result, a division by time is provided. Accordingly, a clock generator T is provided whose clock signal is integrated in an event counter Z. The output signal of the event counter is an index for the time and is applied in a divider DIV for dividing the output signal of the integrator in the sixth block 2.6. The averaged signal is the catalytic converter evaluation quantity DKATI which is compared to a threshold value in a seventh block 2.7. In dependence upon the result of the comparison in the seventh block 2.7, a diagnostic conclusion bit is set in an eighth block 2.8 when the diagnosis yields a functional catalytic converter 7. If needed, the indicating means 11 is activated when the result of the diagnosis clearly indicates a poor catalytic converter 7 which is no longer operational.

Figure 3:
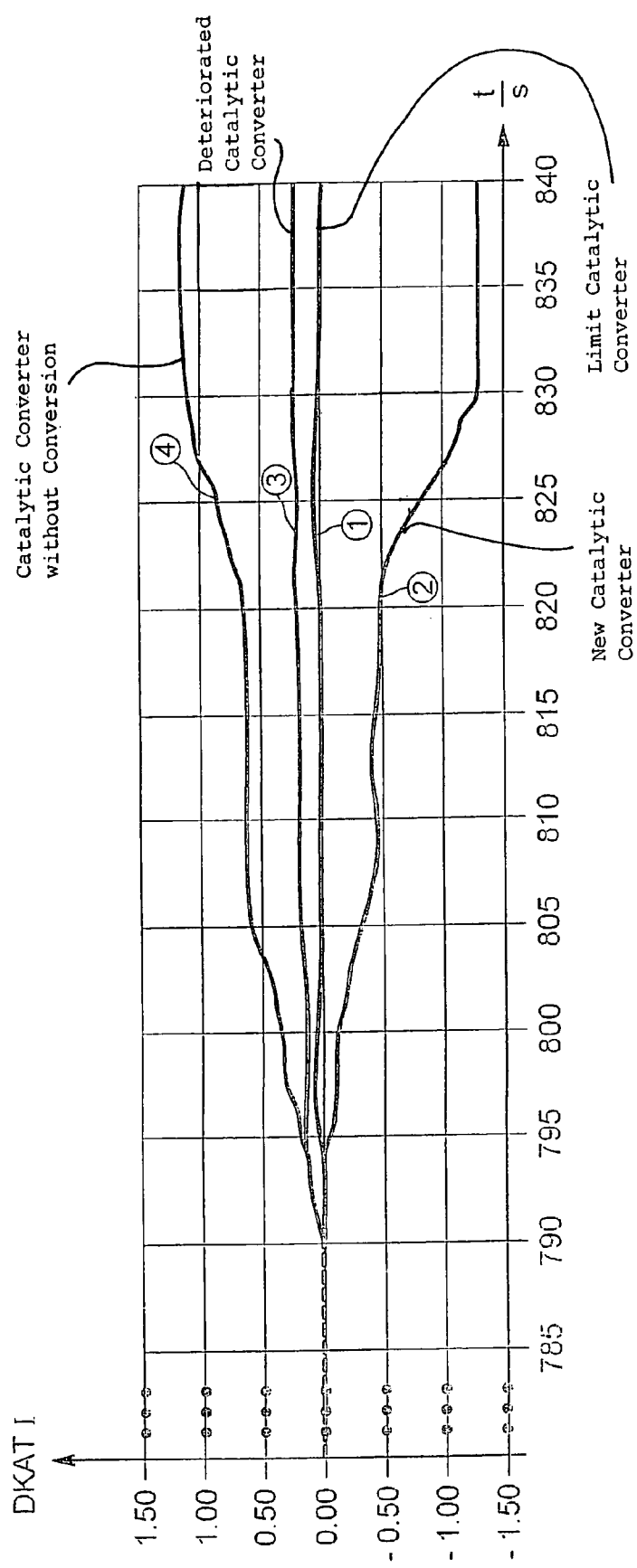
FIG. 3 shows the criteria with which functional catalytic converters can be distinguished from non-functional catalytic converters.

The criteria which permit distinguishing good catalytic converters 7 from poor catalytic converters are explained with reference to FIG. 3 which shows the time-dependent course of the averaged integral DKATI of the difference of the limit value amplitude AHKF and the amplitude AHK for four differently deteriorated catalytic converters 7.

The line 1 corresponds to the catalytic converter 7 which is in approximately the same state of deterioration as the model catalytic converter which is the basis for the formation of the limit value model signal USHK-GMS. The difference and therefore also the time-dependent averaged integral of the difference between the limit value model amplitude and the amplitude AHK are correspondingly slight. The line 1 runs in the vicinity of zero and therefore points to a catalytic converter 7 which corresponds to the model catalytic converter and therefore just satisfies the requirements as to toxic substance conversion.

The line 2 corresponds to a new catalytic converter 7 which is better than the model catalytic converter. The new catalytic converter 7 attenuates the amplitude of the oscillations in the oxygen content of the exhaust gas greater than the model catalytic converter. The obtained amplitudes AHK are therefore less than the limit value model amplitudes AHKF so that the difference is less than zero. The line 2 runs clearly below the zero line and therefore points to a catalytic converter 7 which is still good.

Reversed conditions are present for lines 3 and 4 which point to deteriorated catalytic converters 7. In both cases, the obtained amplitude AHK is greater than the limit value model amplitude AHKF.

From the above, the situation results that the catalytic converters 7 which are still good can be separated from the catalytic converters 7 which are deteriorated because of a threshold which runs between the poor catalytic converters and the good catalytic converters. The position of the threshold (for example, the value zero) is dependent upon the sign convention in the adder ADD and the model assumption which forms the basis of the limit value model amplitude formation. If, for example, a new catalytic converter 7 is the basis for the limit value model amplitude formation, then a course in the vicinity of zero results only for a really new catalytic converter 7. The degree of deterioration would, in this case, be measured from the distance of the measured courses to the zero line. However, all lines would run above the zero line.

In the illustration up to now, a continuous signal path between the adder ADD and the indicator means 11 and/or the eighth block 2.8 for storage of the diagnostic conclusion bit was assumed.

To increase the reliability and reproducibility of the diagnostic statements, the switches S1, S2 are provided in combination with a ninth block 2.9 and a further switch S3. The function of this arrangement comprises interrupting the diagnostic function when certain stop criteria are present. One stop criterion comprises suppressing the diagnosis in specific operating ranges of the internal combustion engine, for example, at high air mass ML or air quantity (generally, high load) and/or high rpm (n). This procedure is, for example, purposeful when the engine is operated in this operating range outside of the lambda=1 control.

This operating state is determined in a tenth block 2.10 which thereupon opens the switches S1 and S2. The opening of the switch S1 effects an interruption of the DKATI-formation and the opening of the switch S2 has the consequence of stopping a time determination. The time measurement takes place also for the purpose to permit the comparison to the diagnostic threshold value in the seventh block 2.7 by closing the switch S3 only after elapse of a predetermined diagnostic time span. The diagnostic time span is not shortened by the stop phases when switches S1, S2 are open. The ninth block 2.9 represents the comparison of the counter state of the event counter Z to a pregiven time threshold value.

As a further stop criterion, the catalytic converter load KATIN can be used. If the load KATIN, for example, exceeds a pregiven maximum value, a not yet filled catalytic converter 7 could not completely store the oxygen charge per unit time connected with high KATIN so that also downstream of the catalytic converter 7, the oxygen would still be measurable. In order to suppress this case of a catalytic converter overload possibly falsifying the diagnostic result, the switches S1 and S2 are here also opened.

Accordingly, the integration is not done when the catalytic converter 7 cannot operate compensatingly on the oxygen content in the exhaust gas.

This can, for example, occur when the oxygen excess or oxygen deficiency, which flows into the catalytic converter 7 per unit of time, exceeds a pregiven maximum value.

In the determination of the catalytic converter load KATIN (if required, per unit of time), the product of the air mass ML or the air quantity, which is inducted by the internal combustion engine 1, if needed, per unit of time, and the deviation of the controller actuating quantity FR from the neutral value, which corresponds to the stoichiometric mixture, can be considered. Alternatively to the controller actuating quantity FR, the deviation of the signal USVK of the exhaust-gas probe 8 ahead of the catalytic converter can be used directly.

Furthermore, the integration is not performed when the oxygen-dependent catalytic converter load KATIN exceeds a pregiven maximum value or drops below a pregiven minimum value.

The pregiven maximum value should correspond to the maximum oxygen storage capacity of a catalytic converter 7 which is just still operational.

In the determination of the oxygen-dependent catalytic converter load KATIN, an integration of the product of the air mass ML or air quantity (which is inducted by the internal combustion engine 1, if needed, per unit of time) and the deviation of the controller actuating quantity FR from the neutral value (which corresponds to the stoichiometric mixture composition) can be considered. Alternatively to the controller actuating quantity, the deviation of the signal USVK of the exhaust-gas probe 8 upstream of the catalytic converter can also be used directly.

As described up to now, the subject matter is already known from the initially mentioned DE 196 23 335 (U.S. Pat. No. 5,987,883). An essential element of the invention lies in the changed formation of the conditions which trigger a stopping of the evaluation of the catalytic converter 7, for example, an integration stop in the integrator of the sixth block 2.6.

Figure 4:
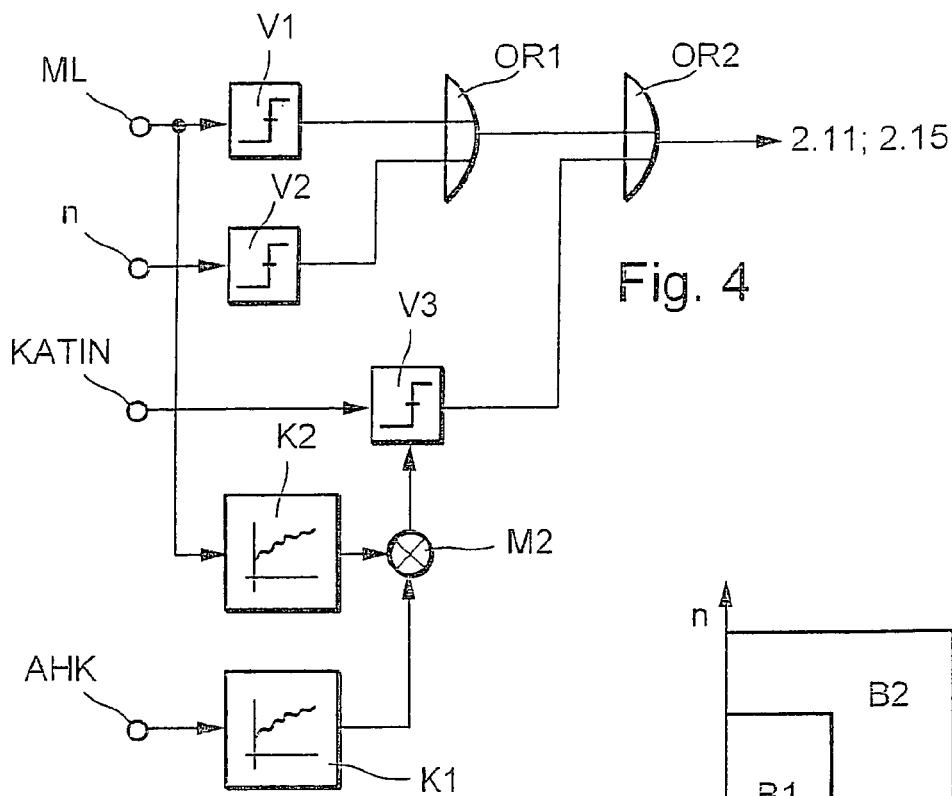
FIG. 4 discloses further details of an embodiment of the invention.

An embodiment of the invention as a configuration of the tenth block 2.10 is shown in greater detail in FIG. 4.

In a first comparator V1, the value of the inducted air mass ML or the air quantity is compared to a threshold value. In a second comparator V2, a comparison of the instantaneous rpm (n) to a threshold value takes place. Each threshold value crossover triggers a stop signal via a first OR logic position OR1 and via a second OR logic position OR2 separately with which the switch S1 and the switch S2 are opened. This stop signal is triggered in the same way via the second OR logic position OR2 when the catalytic converter load KATIN exceeds a threshold value. A third comparator V3 is provided for this determination.

According to the invention, the threshold value for the catalytic converter load KATIN is dependent upon the amplitude AHK of the signal USHK of the exhaust-gas probe 9 downstream of the catalytic converter. The signal AHK after the fifth block 2.5 of FIG. 2 is, if needed, supplied to a first characteristic line member K1 in FIG. 4 which makes possible an influencing of the signal. The output signal of the first characteristic line member K1 is multiplied in a second multiplier member M2 by the output signal of a second characteristic line member K2, which is provided as needed, to which the signal of the air mass ML is supplied. The second characteristic line K2 likewise makes possible an influencing of the signal. The comparison per se takes place, as already mentioned, in the third comparator V3.

The comparison value, which is formed from the air mass ML or the air quantity and the amplitude AHK, is fixed in such a manner that the comparison value for the third comparator V3 becomes less with an increasing amplitude AHK or fluctuation width of the amplitude AHK. Stated otherwise, for a good catalytic converter 7, the amplitudes AHK are lower and, in this case, the diagnosis can lead at least to a diagnostic result at higher catalytic converter load KATIN when the catalytic converter 7 is still operational.

Figure 5:
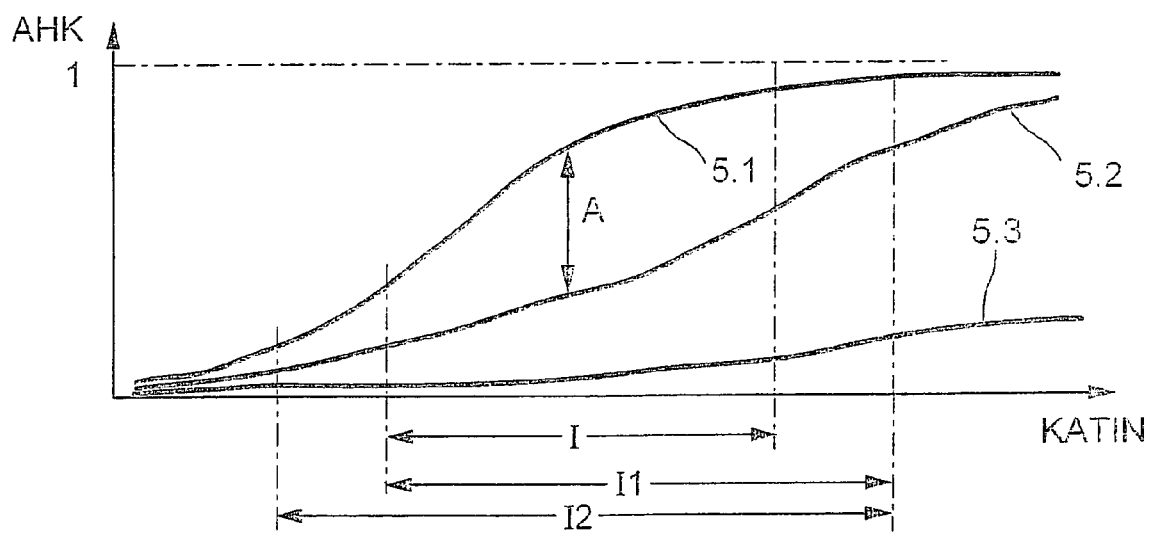
FIG. 5 shows amplitudes, normalized to the value 1, referred to a catalytic converter load for catalytic converters which are deteriorated to different degrees; and, FIG. 6 shows regions of the load/rpm range of an internal combustion engine within which the catalytic converter diagnosis can be carried out in accordance with the state of the art and, as a contrast thereto, how the catalytic converter diagnosis can be carried out in accordance with the invention.

The background of this measure is made clear by FIG. 5 which shows amplitudes AHK, which are normalized to the value 1, as a function of the catalytic converter load KATIN for catalytic converters 7 which are deteriorated to a different extent. KATIN is equal to 1 when the amplitudes AHK of the signal USHK of the exhaust-gas probe 9 rearward of the catalytic converter are maximum. Line 5.1 shows the course for a catalytic converter 7 which is just to be diagnosed as poor. Line 5.2 shows a still operational catalytic converter 7 and line 5.3 shows a comparatively less deteriorated catalytic converter 7. The interval, which is noted by I, on the KATIN axis corresponds to the KATIN range in which the diagnosis in accordance with the state of the art is active. This region is characterized by a comparatively large distance A between the amplitudes AHK downstream of an already deteriorated catalytic converter 7 and a catalytic converter 7 which is still good. This distance A between the lines 5.1 and 5.2 becomes less for a small and large KATIN which means that the reliability of distinguishing a still good catalytic converter from an already deteriorated catalytic converter 7 reduces. The line 5.3, however, retains also at larger KATIN still a comparatively large distance A from the line 1. This means that catalytic converters 7, which are only somewhat deteriorated and which are characterized by a small amplitude AHK or fluctuation width of the amplitude AHK of the signal USHK of the exhaust-gas probe 9 rearward of the catalytic converter, can be clearly distinguished from already deteriorated catalytic converters 7. This is utilized in accordance with the invention in that the active interval I is expanded to a greater interval I1 for small amplitudes AHK.

As an alternative or supplement, an expansion of the active range to smaller KATIN can also be considered which is made clear by showing a further interval I2. As a result, with the invention, the frequency with which a diagnosis can be concluded successfully, that is, with a result, is clearly increased.

Figure 6:
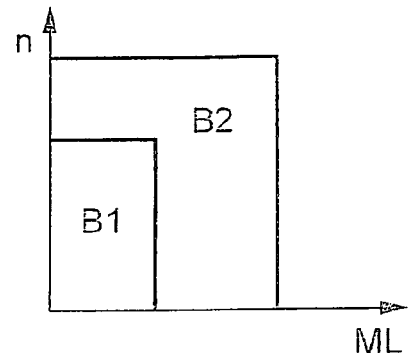

As already noted above, for the known method of catalytic converter diagnosis, the triggering of the diagnosis is limited primarily via a movement out of the permitted load/rpm range. This range is shown qualitatively in FIG. 6 by B1. In contrast, the invention permits, the confirmation of catalytic converters 7, which are assumed to be operational in a greater range B2 which effects the increase, which is sought by the invention, of the frequency of the diagnostic results.

The invention claimed is:

1. A method for diagnosing a catalytic converter, which is arranged in an exhaust-gas system of an internal combustion engine, the method having the steps of:
   detecting a signal (USHK) of an exhaust-gas probe downstream of said catalytic converter with said signal (USHK) having an amplitude (AHK);
   forming a limit value model amplitude (AHKF) from at least one quantity (ML, n) which occurs upstream of said catalytic converter;
   forming a catalytic converter evaluation quantity (DKATI) whose value increases with increasing deviation of said amplitude (AHK) of said signal (USHK) from said limit value model amplitude (AHKF);
   evaluating the operability of said catalytic converter on the basis of said catalytic converter evaluation quantity (DKATI); and,
   stopping the evaluation when an oxygen-dependent catalytic converter load (KATIN) exceeds or drops below a threshold value dependent upon said signal (USHK) of said exhaust-gas probe downstream of said catalytic converter.

2. The method of claim 1, wherein the threshold value is pregiven in dependence upon the fluctuation width of said signal (USHK) of said exhaust-gas probe downstream of the catalytic converter.

3. The method of claim 2, wherein a specific threshold value is assigned to a specific fluctuation width and that the threshold value is reduced when the fluctuation width drops below the specific fluctuation width.

4. The method of claim 2, wherein a specific threshold value is assigned to a specific fluctuation width and that the threshold value is increased when the fluctuation width exceeds the specific fluctuation width.

5. The method of claim 1, wherein said catalytic converter is evaluated as non-functional when said catalytic converter evaluation quantity (DKATI) exceeds a pregiven diagnostic threshold value after a pregiven time span.

6. The method of claim 1, wherein for the formation of said limit value model amplitude (AHKF), as quantities, which occur upstream of said catalytic converter, the following are applied: the air mass (ML) or the air quantity and/or the rpm (n) and/or a signal (USVK) of an exhaust-gas probe forward of the catalytic converter.

7. The method of claim 1, wherein the difference between said limit value model amplitude (AKHF) and said amplitude (AHK) is summed (integrated) to form said catalytic converter evaluation quantity (DKATI).

8. The method of claim 7, wherein the summation does not take place when said catalytic converter load (KATIN) exceeds a maximum value or drops below a minimum value.

9. The method of claim 7, wherein the summation does not take place when the catalytic converter load (KATIN) per unit of time exceeds a maximum value or drops below a minimum value.

10. The method of claim 6, wherein in the formation of the catalytic converter load (KATIN), the product of the air mass (ML) or air quantity (which is inducted by the internal combustion engine per unit of time) and the deviation (which is detected by the exhaust-gas probe ahead of the catalytic converter, of the oxygen concentration in the exhaust gas from the oxygen concentration occurring at stoichiometric combustion) is considered.

11. The method of claim 6, wherein in the formation of said catalytic converter load (KATIN), an integration of the product of the air mass (ML) or the air quantity, which is inducted by the internal combustion engine per unit of time, and the deviation of a controller quantity (FR) of a mixture control loop from a neutral value is considered.

12. An electronic control arrangement for diagnosing a catalytic converter, which is arranged in an exhaust-gas system of an internal combustion engine, the arrangement comprising:
   means for detecting a signal (USHK) of an exhaust-gas probe downstream of said catalytic converter with said signal (USHK) having an amplitude (AHK);
   means for forming a limit value model amplitude (AHKF) from at least one quantity (ML, n) which occurs upstream of said catalytic converter;
   means for forming a catalytic converter evaluation quantity (DKATI) whose value increases with increasing deviation of said amplitude (AHK) of said signal (USHK) from said limit value model amplitude (AHKF);
   means for evaluating the operability of said catalytic converter on the basis of said catalytic converter evaluation quantity (DKATI); and,
   means for stopping the evaluation when an oxygen-dependent catalytic converter load (KATIN) exceeds or drops below a threshold value dependent upon said signal (USHK) of the exhaust-gas probe downstream of the catalytic converter.

* * * * *